3,278,602
MONO- AND DI-BORNYL-DIPHENYLAMINES

Robert L. Peeler, Albany, Calif., assignor to Chevron Research Company, a corporation of Delaware
No Drawing. Filed Mar. 28, 1963, Ser. No. 268,591
1 Claim. (Cl. 260—576)

This application is a continuation-in-part of application Serial No. 213,131, filed July 30, 1962, and now abandoned.

This invention relates to lubricant compositions. More particularly, it relates to lubricants containing a dibornyldiphenylamine antioxidant having superior oxidation and nonsludging properties.

Prior art antioxidants such as N-phenyl-α-naphthylamine have been extensively used in lubricating oils. However, the above compound suffers from a tendency to precipitate in the form of a polymer. The polymeric deposits are very detrimental, especially in oils and greases used in close tolerance machinery. Further, the tendency of the inhibitor to form hard nitrogen-containing sludges often causes clogging of oil ports in circulating oil systems. Additionally, the antioxidant sludge, which forms a visible precipitate, gives a poor appearance to the oils.

It has now been found that dibornyldiphenylamine is essentially nonsludging in lubricating oils and greases.

Thus, the present invention involves a lubricating oil or a grease containing as a nonsludging antioxidant in an amount sufficient to inhibit oxidation dibornyldiphenylamine. The preferred species is p,p'-dibornyldiphenylamine. The other bornyl isomers are within the scope of the invention and include those found in the o-, m- or p-positions of both phenyl nuclei.

As mentioned before, the compounds of the present invention are found to be superior to phenyl-α-naphthylamine which, although an effective and widely accepted oxidation inhibitor, precipitates a yellow sludge on mild oxidation in either oil or silicate base lubricants. This precipitate occurs even in white oil, which does not contribute to the sludge itself. Infrared, ultraviolet and elemental analyses of the precipitate show it to be a polymer derived from the inhibitor rather than from the oil.

This compound is most conveniently prepared by the reaction of two mols of α-pinene with one mol of diphenylamine, using acidic catalysts such as anhydrous aluminum chloride.

The following example illustrates the preparation of the aforementioned compounds and is not intended to unduly limit the scope of the invention.

*Example.—Preparation of dibornyldiphenylamine*

169 g. of diphenylamine was added to a 1-liter, 3-neck flask equipped with a thermometer, stirrer and reflux condenser. The compound was heated to 60° C. and 13.3 g. of anhydrous AlCl₃ was added with stirring. 272 g. of α-pinene was added in small increments over a period of one hour, the temperature being allowed to rise to 68° C. The reaction mixture was then heated to 90° C. and held at that temperature with stirring for one hour. The mixture was cooled to room temperature and 200 ml. of petroleum thinner (100° C. distillation midpoint) was added. The product was washed first with 100 ml. of 3 N sulfuric acid, then twice with 100 ml. portions of water, then with 100 ml. of 5% NaHCO₃ solution, and finally with 100 ml. water, each time discarding the washings. The mixture was then stripped to a pot temperature of 160° C. The resulting product was a viscous liquid weighing 406 g. and analyzing 3.59% N by weight.

Fractional distillation of this product, followed by characterization of each cut gave the following results:

| Constituent: | Wt. percent |
|---|---|
| Solvent and unreacted α-pinene | 3.8 |
| Unreacted diphenylamine | 4.7 |
| Bornyldiphenylamine | 21.0 |
| Dibornyldiphenylamine | 70.5 |
| Total | 100.0 |

Infrared examination of the crude reaction product and the bornyl and dibornyl substituted amines indicates that substitution occurs almost completely at the para position of the phenyl rings with only traces of the ortho and meta substituted components being present.

Although the α-pinene and diphenylamine reaction mixture may be separated to yield the pure mono- and dibornyl derivatives, the mixture itself of dibornyl and monobornyl diphenylamine generally containing at least 50% by weight dibornyl diphenylamine proves to function well as an antioxidant and the following test data were compiled using the reaction mixture which in the test results is referred to as "dibornyl diphenyl amine."

The N-phenyl-α-naphthylamine and the dibornyldiphenylamine were compared by means of sunlight exposure test. In the sunlight exposure test the sample in conventional four ounce laboratory bottles are observed every 24-hour day, and the time in days noted for the first appearance of cloudiness or precipitate.

The test data given below embody the above-described procedure. Both of the compounds were employed in concentrations of 10 millimoles per kilogram of medicinal grade white oil.

TABLE I

| Additive: | Sunlight life, days |
|---|---|
| N-phenyl-α-naphthylamine | 3 |
| Dibornyldiphenylamine | 22 |

Sunlight life of the dibornyldiphenylamine is far superior to the conventional N-phenyl-α-naphthylamine.

The following test illustrates more convincingly the new superior antioxidant. The stability of turbine oil was determined according to ASTM Standard Method D–943–54. Using this method, the test was stopped when the acid number exceeded about 2.0. The acid number was found according to ASTM Standard Method D–974. The used oil was filtered through Whatman No. 2 filter paper, the precipitate washed with hexanes and dried.

The table illustrates a comparison of dibornyldiphenylamine with N-phenyl-α-naphthylamine. The tests were of paraffin base oil plus 0.25% sulfurized diparaffin sulfide plus 0.06% alkenylsuccinic acid rust inhibitor plus 0.0005% dimethyl silicone foam inhibitor.

TABLE II

| Inhibitor | Dibornyl-diphenyl-amine | N-phenyl-α-naphthyl-amine |
|---|---|---|
| Amount of Inhibitor, percent | 0.2 | 0.5 |
| Hours until test terminated | 552 | 552 |
| Acid number at termination of test | 1.62 | 1.25 |
| Insoluble material, mg | 67 | 175 |
| Percent nitrogen in insoluble material | 0.62 | 2.93 |
| Appearance of coil deposit [1] | None | Heavy |

[1] Based on an arbitrary scale: none, trace, medium and heavy, depending on the appearance of the coil. "Heavy" indicates the coil is completely covered with deposits. "Medium" indicates the coil is partially covered with deposits. "Trace" indicates only a few spots are found on the coil.

As illustrated above, the amount of insolubles is considerably less using the improved oil composition. The oil composition containing the old N-phenyl-α-naphthylamine inhibitor was roughly about five times poorer.

Ordinarily, a major proportion of lubricating oil is employed in combination with a minor amount of inhibitor sufficient to inhibit oxidation. Preferably the amount of inhibitor in oil will vary from about 0.05% to about 5.0%. The effective amount, however, can easily be determined by those skilled in the art.

The inhibitors of this invention are used with good effect in any of a wide variety of oils of lubricating viscosity or of blends of such oils. Thus, the base oil can be a mineral lubricating oil of either paraffinic or naphthenic types. Synthetic lubricating oils may also be used, including alkylene oxide polymers such as the 2-ethylhexanol-initiated polymer of propylene oxide and/or ethylene oxide. Esters of carboxylic acids, such as di-(2-ethylhexyl) sebacate are also suitable. Silicate esters, such as tetraoctyl silicate, hexa-(2-ethylbutoxy) disiloxane and mixtures thereof may be used. If desired, the base oil can be a mixture of mineral oils and/or synthetic oils.

The inhibitors of this invention are also useful in lubricant compositions in combination with other additives such as pour point depressants, oiliness and extreme pressure agents, detergents, viscosity index improvers, soap thickening agents of the type employed in greases, as well as other conventional additives.

Illustrative additives of these types include the polyalkyl methacrylate and dialkyl fumarate pour point depressant, tricresyl phosphate oiliness agent, octadecenyl amine salt of mixed mono- and didodecyl phosphate extreme pressure agent, polydodecyl methacrylate viscosity index improvers, calcium petroleum sulfonate detergents, polyglycol-substituted polymeric dispersants, and others.

According to the present invention, the antioxidants may be admixed with oil to form concentrates. The concentrate can be later diluted to form the finished product.

What is claimed is:

A reaction mixture obtained by reacting about two mols of α-pinene with one mol of diphenylamine in the presence of an acidic catalyst, said mixture consisting essentially of monobornyl diphenylamine and dibornyl diphenylamine, said dibornyl diphenylamine being present in the mixture in the amount of at least 50% by weight.

References Cited by the Examiner
UNITED STATES PATENTS

| | | |
|---|---|---|
| 2,009,480 | 7/1935 | Craig _____ 252—50 |
| 2,180,936 | 11/1939 | Dunbrook _____ 260—576 |
| 2,194,079 | 3/1940 | Smith et al. _____ 260—576 |
| 2,476,271 | 7/1949 | Bartleson _____ 252—50 |
| 2,776,994 | 1/1957 | Wolfe et al. _____ 260—576 |
| 3,026,263 | 3/1963 | Arimoto _____ 252—50 |

CHARLES B. PARKER, *Primary Examiner.*

JOSEPH R. LIBERMAN, *Examiner.*

T. D. TAYLOR, ROBERT V. HINES,
*Assistant Examiners.*